Aug. 1, 1944.  W. MESSINGER ET AL  2,354,870
HIGH SPEED BEARING
Filed Nov. 1, 1941  2 Sheets-Sheet 1
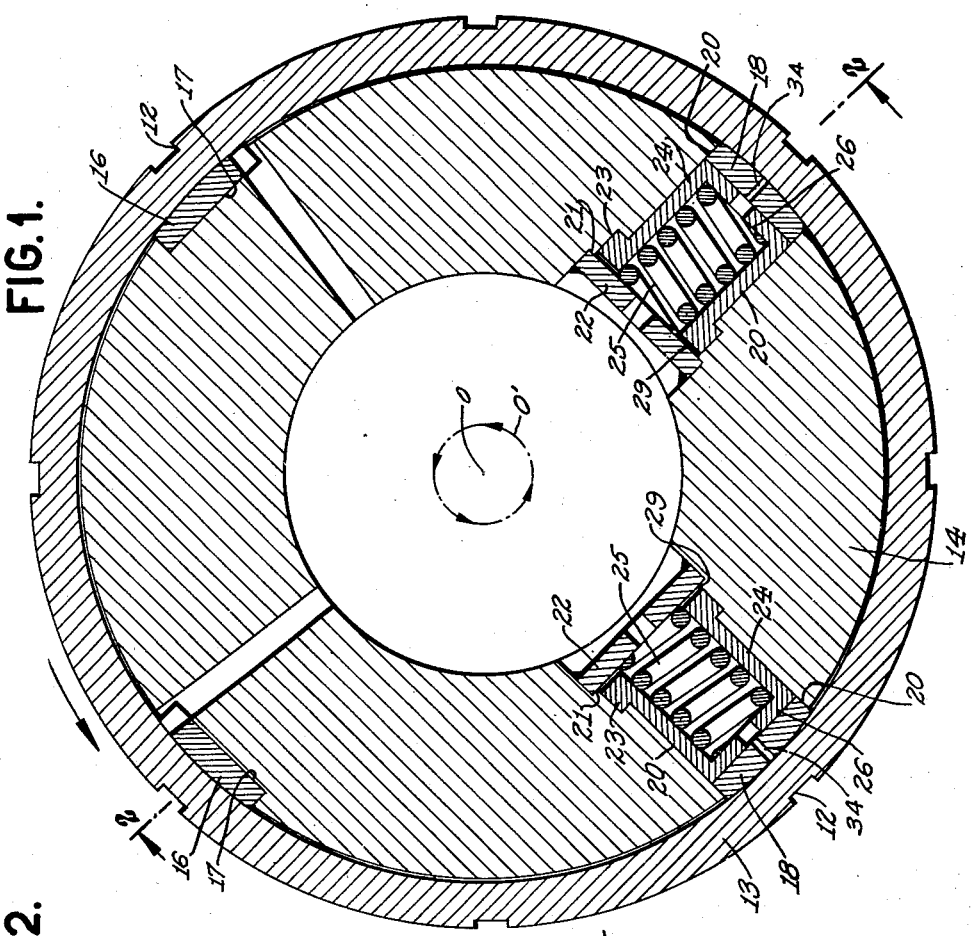
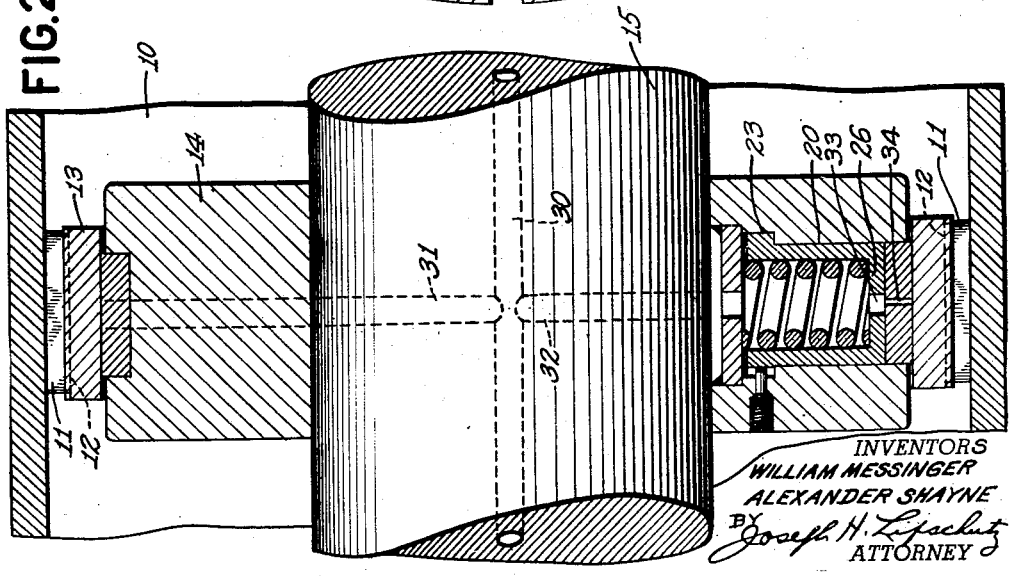
INVENTORS
WILLIAM MESSINGER
ALEXANDER SHAYNE
BY Joseph H. Lipschutz
ATTORNEY Aug. 1, 1944.    W. MESSINGER ET AL    2,354,870
HIGH SPEED BEARING
Filed Nov. 1, 1941    2 Sheets-Sheet 2

INVENTORS
WILLIAM MESSINGER
ALEXANDER SHAYNE
BY Joseph H. Lipschutz
ATTORNEY

Patented Aug. 1, 1944

2,354,870

UNITED STATES PATENT OFFICE 2,354,870

HIGH-SPEED BEARING

William Messinger, Philadelphia, Pa., and
Alexander Shayne, New York, N. Y.

Application November 1, 1941, Serial No. 417,514

3 Claims. (Cl. 308—73)

This invention relates to improvements in high speed bearings for rotors, such as shafts and tubes or cylinders, whether rotating about a vertical or horizontal axis, and has for its object the elimination of nutation and excessive vibration when rotated at high speeds. It is well known that rotors of this type require a substantial clearance between the rotating object and the supporting bearing sufficient not only to enable an oil film to build up for the purpose of supporting the rotor, but also to supply enough oil to lubricate and cool the bearing and also to compensate for variations due to the different temperature coefficients of the various elements employed and to the different temperatures in various parts of the elements comprising the system. This clearance varies with the diameter of the journal, unit pressures on the bearing, viscosity of the oil, peripheral speed of the rotating element, etc., and may be as high as .025 inch on each side between the shaft and the bearing. Such clearance creates a condition in the supporting structure which permits an oscillation of the rotor to build up which reaches dangerous proportions at high speed and definitely limits the rate of rotation of such revolving members. This condition can arise because a slight unbalance is almost always present, and an unbalance even to the extent of one ounce in a rotor weighing many tons, can set up an oscillation of its own. These two factors, therefore, create a condition which gives rise to excessive vibration and makes it impossible to rotate shafts or rotors of large size and weight at high speeds. Thus, for example, in the case of a machine wherein paint is sprayed upon a rapidly rotating cylinder for breaking up the paint in the form of a mist, it is desirable to rotate this cylinder at as high speed as possible in order to obtain the most effective action of breaking up the paint when the latter strikes the cylinder. This cylinder is in the form of a drum approximately 12 inches outside diameter and 115 inches long, and heretofore no bearing of known type has been found which could withstand a speed of more than 1800 R. P. M., and even at this rate of rotation such bearings were found to have a very short life. By this invention a speed of 4,000 R. P. M. for the drum just specified has been obtained without deterioration of the bearing over a long period of time.

It has been proposed heretofore to solve the above problem by providing within the circular bearings at a plurality of points, preferably symmetrically disposed around the periphery, a plurality of small, flexibly supported bearing blocks adapted to engage the rotating object, as shown in Patent No. 2,003,316, granted June 4, 1935, A. E. Schein, inventor. The advantages claimed for this construction are, first, that since these bearing blocks are flexibly supported, it is not necessary to provide the large clearances which were heretofore essential when the entire periphery of the bearing formed the bearing structure. Thus the blocks could be initially positioned close to the rotor surface, for example, within .002 inch, and thus the large clearance heretofore deemed necessary is avoided and one inherent cause for the oscillation of the rotor is completely eliminated. As the oil film builds up, the flexibly held bearing blocks yield only sufficiently to permit this oil film to form, and if excessive loads are suddenly placed upon any given portion of the bearing, the particular bearing block or blocks would yield by compressing its supporting spring.

The other advantage claimed for this construction was that if the rotor itself were out of balance and tended to rotate about a different axis from the axis of the bearing, the flexible bearing blocks would permit such rotation, and vibration thus would not be set up. This, however, was correct only where the rotor was well-balanced and within small limits of unbalance, because an unbalance in the rotor with consequent displacement of the axis about which the rotor revolves, causes not a fixed linear displacement of the axis of rotation, but rather by reason of the fact that all the bearing blocks around the periphery are flexibly mounted, permits this axis of rotation to travel in a circular path, although considerably damped by the springs, in other words, in a nutating movement which consequently tends to set up vibration in the rotor. This invention, therefore, has for its principal object the improvement of a high speed bearing of the type which employs flexibly mounted bearing members, which, however, will reduce vibration. This in turn will permit the rotor to be driven at much higher speeds than heretofore without damage to the bearing, as, for instance, in the example cited above wherein a rotor which by virtue of its construction could not be well-balanced and which had previously had a maximum speed of rotation of 1800 R. P. M. with damage to the bearings within a very short time, is now being operated at 4,000 R. P. M., in its original condition of unbalance, over a long period of time with no wear on these bearings.

Further objects and advantages of this invention will become apparent in the following detailed description thereof.

In the accompanying drawings,

Fig. 1 is a vertical section through a bearing embodying this invention and shown as applied to the support of a cylindrical rotor.

Fig. 2 is a vertical section taken substantially on the line 2—2 of Fig. 1, shown positioned within a drum connected thereto.

Figure 3:
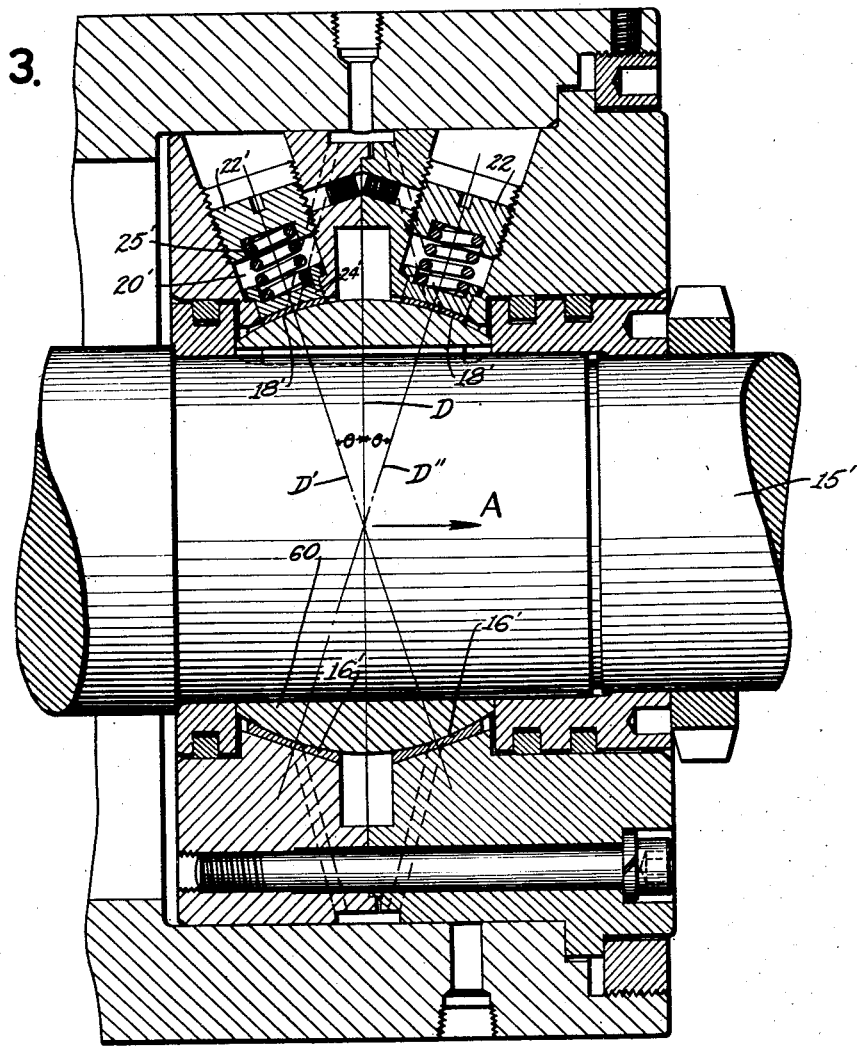
Fig. 3 is a view similar to Fig. 2 showing a modified form of the invention adapted to take up axial as well as radial thrusts.

Referring to the drawings, this invention is shown in Figs. 1 and 2 as applied to the support of a large drum or cylinder, in which case the bearing is mounted on a fixed shaft extending through the drum and the drum is rotated while being supported on its inner periphery. However, this invention applies also to the case where rotating shafts are supported inside the bearing which then surrounds the rotating shaft and engages the periphery of the shaft, as disclosed in Figs. 3 and 4.

In the form of the invention shown in Figs. 1 and 2 of the drawings, a large drum 10, which may be the drum of the device hereinbefore described, viz., a rapidly rotating drum upon which paint is sprayed for the purpose of breaking up the paint in the form of mist which is then deposited upon a suitable surface such as paper or textile, is supported upon the bearing forming this invention. The drum is rotated at high speed by any suitable means, not shown, such as a motor driving through gearing fixed to the drum. The drum is supported upon the bearing by means which may include a plurality of keys 11 fixed to the inner surface of the drum parallel to the axis thereof, and adapted to engage in grooves 12 in a ring 13 which is rotatably mounted upon a sleeve 14 fixed upon a shaft 15 which in turn is fixed against rotation in suitable standards, not shown. The support for the shaft 15 is such that it may be disengaged at one end to permit the drum to be assembled thereon.

The ring 13 and therefore the drum 10 is supported for rotation upon the sleeve 14 which carries in its outer periphery a plurality of bearing linings or bearing-metal pads 16 and 18, preferably positioned symmetrically around the periphery. The linings 16 are fixedly positioned within grooves 17 while the linings 18 are positioned within cylindrical bores 20 extending through the wall of sleeve 14. Each bore 20 is provided with an enlarged inner shoulder 21 within which is fixed, as by welding, a plate 22. This plate forms a stop or limiting position for the flange 23 of a cylinder 24 slideable within the cylindrical bore 20. A compression spring 25 rests at one end against fixed plate 22 and at the other end on the closed end 26 of the cylinder 24. The bearing linings 18 are fixed to the outer surface of the closed ends 26 of cylinders 24, and the springs 25 normally press the cylinders 24 outwardly until the flanges 23 reach the outer ends of their retaining grooves. At this point there is a clearance 29 which may be of any desired magnitude, depending upon the particular application of the invention, and in the example which we have chosen this clearance is approximately .012 inch. With the parts in this position, the linings 18 extend outwardly beyond the outer periphery of sleeve 14 to such extent that when ring 13 is positioned thereover the entire clearance between ring 13 and sleeve 14 is taken up by the linings. This clearance is, as heretofore stated, small, on the order of .002 inch, just sufficient to permit the supporting oil film to build up. When, however, the load is applied to these linings 18, the springs are compressed and the cylinders 24 are moved inwardly with flanges 23 approaching the fixed plate 21. Oil may be supplied to the bearing surfaces from a central duct 30 extending through the fixed shaft 15 and thence by way of branch ducts 31 and 32 to the surface of the fixed linings 16 and by way of the interiors of the cylinders 24 and ducts 33 and 34 to the surfaces of flexibly supported linings 18.

As stated in the introduction hereto, it has heretofore been proposed to provide a bearing in which all of the linings around the periphery were yieldably and flexibly supported in the manner of the linings 18, and as stated hereinbefore, any unbalance in the rotor, causing it to rotate around an axis displaced from the geometric axis of the bearing and of the rotor, set up a nutation. Thus, if as shown in Fig. 1, in exaggerated form, an unbalance caused the axis of rotation of the rotor to be displaced from O to O', the axis O' would, by reason of the fact that all of the linings were yieldable and flexible, traverse a path indicated by the arrows, which is a path of nutation or oscillation which caused a vibration to be set up in the rotor at high speeds. By making certain of the linings fixed while certain others are yieldable, this condition is avoided, for even if the unbalance of the rotor causes the axis of rotation to be displaced from O to O', it cannot travel in the nutating path O' shown by the arrows, by reason of the fact that the linings 16 are fixed. Thus, the tendency of the rotor to vibrate or oscillate due to unbalance which has previously been present in radial bearings having all of the bearing points yieldably mounted, is reduced. It is obvious that this result is obtained by reason of the fact that certain of the bearing points are fixed while others are yieldable. While there are shown two fixed bearing points, it will be understood that more or less than two may be employed providing that at least one bearing point is fixed. Also, while there are shown two yieldably and flexibly mounted bearing points, more or less than two may be employed. Preferably, however, the bearing points at one side of a diameter are fixed while bearing points on the other side of the diameter are movable. Where the axis of rotation of the rotating member is horizontal, the fixed bearing points are preferably so positioned as to carry the weight of the rotating member. In the form of the invention shown in Figs. 1 and 2, the bearing is inside the rotating tube and therefore the upper linings 16 and 17 are fixed since they carry the weight of the tube.

Figure 4:
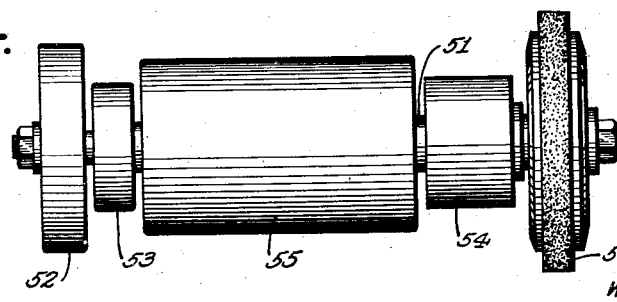
Fig. 4 is an assembly view of a grinding machine embodying this invention.

In the Fig. 3 form of the invention there is a central rotating shaft 15', and the bearing members surround this shaft so as to engage the periphery thereof. In this case the weight of the rotating shaft will be carried by the lower linings 16', while the upper linings 18' are yieldable.

The form of invention disclosed in Fig. 3 is particularly applicable to that type of device wherein a rotating member is subject not merely to high radial thrusts but must be held against axial thrusts as well. Thus, in the case of the grinding machine disclosed in Fig. 4, there is a grinding wheel 50 carried at one end of a rotating shaft 51 and designed to cut a groove of definite width. Such grinder must be held against axial thrusts, otherwise the width of the groove which the grinding element will cut will be indefinite and inaccurate. The shaft 51 carries a balancing fly-wheel 52 at its other end and is journaled by two bearings contained in housings 53 and 54, while motor elements 55 surround the shaft which carries the motor armature. The type of bearing disclosed in Fig. 3 may be employed in both housings 53, 54, but if desired one of the bearing elements such as the element in housing 54 may be of the type disclosed in Fig. 3 designed to take up axial and radial thrusts while the other bearing in housing 53 may be of the type disclosed in Figs. 1 and 2, with the parts reversed if the central shaft is rotated, designed to take up radial thrusts only.

The construction of the bearing disclosed in Fig. 3 which is designed to take up both axial and radial thrusts will now be described. Whereas, in the Figs. 1 and 2 form of the invention the linings were arranged at opposite ends of a diameter normal to the longitudinal axis of the device, in this form of the invention two sets of linings are provided on opposite ends of diameters D' and D'' symmetrically disposed on either side of diameter D by the equal angles θ. Each of the diameters D, D' and D'' are diameters through the spherical journal 60 carried by the rotating shaft. Fixed bearings 16' are provided in engagement with the spherical journal 60 on the lower side thereof and at the lower ends of diameters D' and D'' so as to carry the weight of rotating shaft 15', while at the opposite ends of diameters D' and D'' there are provided the linings 18' yieldably mounted for radial reciprocating movement in a manner similar to the linings 18 of Fig. 2. The linings 18' are fixed to cylinders 24' operating within cylindrical bores 20' against the action of springs 25' interposed between the sleeves 24' and fixed heads 22'. Clearances are of the order described in connection with the Figs. 1 and 2 forms.

It will now be seen that the diametrical lines D' and D'' may be considered vectors or composite forces consisting of a force D which is radial and a force A which is axial, and therefore the bearings at the ends of these diameters D' and D'' will offer resistance to movements of shaft 15' in both radial and axial directions. Thus the tendency of the shaft 15' to be displaced axially is overcome and at the same time the tendency of the unbalance of the shaft to set up vibration is overcome by reason of the arrangement of the fixed bearing points 16' and the yielding bearing points 18'. This is of considerable importance in machines such as the grinder shown in Fig. 4, for the reasons hereinbefore stated.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. A high speed bearing for rotors, this bearing comprising a plurality of spaced bearing elements adapted to engage the rotor, means for supporting certain of the elements fixedly, and means for supporting the remainder of the elements yieldably, the yieldable supporting means being inclined in opposite directions at an acute angle with respect to the longitudinal axis of the rotor, whereby these elements yield radially to, and in either direction axially of, the longitudinal axis of the rotor.

2. A high speed bearing for rotors, this bearing comprising a plurality of pads of relatively short circumferential length, the rotor being supported solely by the pads, a fixed support for the pads, the pads being completely embedded in the support below the surface of the support except for the bearing surfaces whereby all of the pads are fixed against yielding movement circumferentially of the rotor, certain of the pads being fixed in the support also against radial movement, and means whereby certain other of the pads are yieldably mounted in the support for radial movement.

3. A high speed bearing for rotors, this bearing comprising a plurality of spaced bearing elements adapted to engage the rotor, each of said elements being of relatively short circumferential length, means for supporting certain of the elements fixedly, and means for supporting the remainder of the elements yieldably, the yieldable supporting means being inclined in opposite directions at an acute angle with respect to the longitudinal axis of the rotor, whereby these elements yield radially to, and in either direction axially of, the longitudinal axis of the rotor.

WILLIAM MESSINGER.
ALEXANDER SHAYNE.